United States Patent
Kienzle et al.

(10) Patent No.: US 9,038,121 B2
(45) Date of Patent: *May 19, 2015

(54) BIT-RATE CONSTRAINED TRICK PLAY THROUGH STREAM SWITCHING AND ADAPTIVE STREAMING

(75) Inventors: Martin G. Kienzle, Briarcliff Manor, NY (US); Krishna Ratakonda, Yorktown Heights, NY (US); Deepak S. Turaga, Elmsford, NY (US); Durga Sai Phaneendhar Vemuru, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 952 days.

This patent is subject to a terminal disclaimer.

(21) Appl. No.: 12/132,028

(22) Filed: Jun. 3, 2008

(65) Prior Publication Data

US 2008/0271102 A1 Oct. 30, 2008

Related U.S. Application Data

(63) Continuation of application No. 11/337,065, filed on Jan. 19, 2006, now Pat. No. 7,577,980.

(51) Int. Cl.
| | |
|---|---|
| *H04N 7/173* | (2011.01) |
| *H04N 21/234* | (2011.01) |
| *H04N 21/2343* | (2011.01) |
| *H04N 21/2387* | (2011.01) |
| *H04N 21/239* | (2011.01) |
| *H04N 21/44* | (2011.01) |
| *H04N 21/6587* | (2011.01) |

(52) U.S. Cl.
CPC ..... *H04N 7/17336* (2013.01); *H04N 21/23424* (2013.01); *H04N 21/234381* (2013.01); *H04N 21/2387* (2013.01); *H04N 21/2393* (2013.01); *H04N 21/44016* (2013.01); *H04N 21/6587* (2013.01)

(58) Field of Classification Search
USPC .......................................................... 725/115
See application file for complete search history.

(56) References Cited

U.S. PATENT DOCUMENTS

| | | | | |
|---|---|---|---|---|
| 5,659,539 | A  * | 8/1997 | Porter et al. ................... | 709/231 |
| 6,065,050 | A  * | 5/2000 | DeMoney ...................... | 709/219 |
| 6,389,218 | B2 | 5/2002 | Gordon et al. | |
| 6,608,966 | B1 | 8/2003 | Anderson et al. | |
| 6,871,006 | B1 | 3/2005 | Oguz et al. | |

OTHER PUBLICATIONS

K. Yang, et al. "Restructuring GOP algorithm to reduce video server load on VCR functionality", Proc. IEEE ICPP'03, Oct. 2003, pp. 1-8.
C. Lin et al. "MPEG video streaming with VCE functionality", IEEE Trans. Circuits and Systems for Video Technology, vol. 11, No. 3 Mar. 2001, pp. 415-425.

* cited by examiner

*Primary Examiner* — Hunter B Lonsberry
*Assistant Examiner* — Christine Kurien
(74) *Attorney, Agent, or Firm* — Tutunjian & Bitetto, P.C.; Anne V. Dougherty

(57) ABSTRACT

A system for bit-rate stream playout at preset speeds including a regular playout speed and other than the regular playout speed includes multiple streams encoded at a same bit-rate (R) but at a plurality of playout speeds. A selection mechanism is responsive to requests for playout speeds. The selection mechanism selects from among the plurality of streams to service a request.

18 Claims, 2 Drawing Sheets

BIT-RATE CONSTRAINED TRICK PLAY THROUGH STREAM SWITCHING AND ADAPTIVE STREAMING

RELATED APPLICATION INFORMATION

This application is a Continuation application of U.S. patent application Ser. No. 11/337,065 filed on Jan. 19, 2006, now U.S. Pat. No. 7,577,980 incorporated herein by reference in its entirety.

BACKGROUND

1. Technical Field

The present invention relates to data streaming and, more particularly, to systems and methods for selecting bit rates to enable trick play modes through stream switching, and adaptive streaming.

2. Description of the Related Art

A stream may be described as an encoding that includes a sequence of frames. In one example of a stream, the sequence of frames may be of different types. For example, in an advanced video coding (AVC) (similarly for MPEG 1, 2, 4) encoded video stream, I, P, and B-frames are employed. Furthermore with AVC, these streams can be encoded at a fixed bit-rate with arbitrary dependencies between the video frames.

Trick play refers to playing out the multimedia at variable playout speeds, e.g., fast forward, rewind, or slow motion. The term "rate" is used to refer to the number of bits per unit time, and the term "speed" is used to refer to the playout in terms of the number of frames in unit time. Due to the predictive nature of the video frame encodings, achieving an increase in playout speed by naively increasing the decoding rate at the player and streaming to sustain the rate would increase the streaming bit-rate; and potentially strain the network.

SUMMARY

A system for bit-rate stream playout at preset speeds including a regular playout speed and other than the regular playout speed includes multiple streams encoded at a same bit-rate (R) but at a plurality of playout speeds. A selection mechanism is responsive to requests for playout speeds. The selection mechanism selects from among the plurality of streams to service a request.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
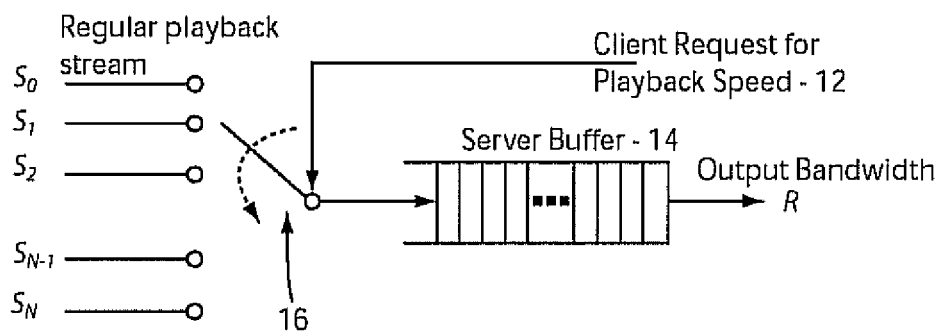
FIG. 1 is a schematic diagram of a server or other device configured to provide data streams to a client or clients in a network.

Aspects of the present invention include enabling trick play modes through stream switching, and adaptive streaming. The aspects and features of systems and methods described herein include supporting arbitrary playout speeds (both forward and rewind) within preset limits, ensuring no delay fast-forward, rewind and slow motion; ensuring that the streaming bit-rate is equal to or smaller than the bit-rate needed for regular playout; performing bit-rate adaptation using the trick play streams; and supporting constant video quality of each decoded frame (as compared across different playout speeds) in the trick play modes.

The following notations will be used throughout the description. The playout speed is denoted by P. The regular playout speed is $P=1$. Fast forward playout speeds correspond to $P>1$ and slow motion playout speeds correspond to $0<P<1$. Similarly, rewind at regular playout has $P=-1$, fast rewind has $P<-1$ and slow rewind has $-1<P<0$. Consider also that the regular stream has a bit-rate R.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings in which like numerals represent the same or similar elements and initially to FIG. 1, an illustrative system 10 is shown for implementing a plurality of rates in a playback device. System 10 may be disposed in a system server or other device that is configured to provide data streams for use by one or more clients or consumers. System 10 may be connected to a network, such as the Internet, a cable network, a local area network, a home network, a telephone network or any other suitable network. System 10 may be included in a computer, set top box or other rendering device where multiple streams are available or trick play modes are useful.

Fast forward and rewind features are described at a constant transmission bit-rate (R). To support regular playout and full motion fast forward (P≥1) at variable speeds greater than the regular playout speed, different encodings can be generated (e.g., using AVC, or other video coding standards) or different streams ($S_0$-$S_N$) can be provided at the desired playout speeds, or at the same bit-rate (R) as the regular stream $S_0$. The system can also change streams using a switching or selection mechanism 16 between these streams (S) at a server (e.g., buffer 14) based on client request 12. Switching mechanism 16 may include a hardware switch, multiplexer, software or any other mechanism for selecting/switching between streams.

These multiple streams (corresponding to the different playout speeds) preferably reside in a same multimedia asset (memory, device etc.). In this way, there is no delay in the switching across streams. Also, this means that connections etc. do not need to be reestablished between switching. This also relates to a buffer flush (that is mentioned below) when switching across playout speeds.

Consider a simple example where the server has the original stream (at regular playout speed P=1), $S_0$, and the option to select from among N additional streams labeled $S_1$ through $S_N$, with playout speeds $P_1$, through $P_N$ (>1). Each stream S is encoded at the same bit-rate R, and therefore the decoded frames have similar quality across the different streams. There may be some degradation in quality due to the motion compensated prediction being from farther reference frames.

Based on the client request 12, about the desired playout speed, the server 14 selects from among the available streams to send to the client in accordance with the request.

In the simple example shown above the server does not support arbitrary playout speeds, but supports only a set of speeds $\{1, P_1, \ldots, P_N\}$. Furthermore, in one embodiment, to have no delay in the switching across the streams, the streaming buffer 14 is kept small, and packets are discarded from the previous stream (e.g., the buffer is flushed at the server and the client) whenever a switch is performed.

To support rewind at multiple playout speeds P≤−1 greater than or equal to the regular playout speed, multiple streams are generated encoded in reverse at the desired playout speeds, and at the same bit-rate (R). Furthermore, since the stream is encoded in reverse, there is no additional delay incurred, as in methods where the stream is decoded in the forward direction and displayed in the reverse direction, where the minimum delay is one "Group Of Pictures" (GOP). These streams can be switched at the server 14 based on the client request 12. This stream switching can support a number of playout speeds.

Slow forward and rewind at a bit-rate less than R can be provided. Slow forward motion speeds 0<P<1 can be generated by adaptively streaming packets from the regular playout stream. For example, if it is desired to playout at half the regular speed, the packets are sent out at twice the interval of regular playout, e.g. if regular playout packets are sent out every Δ seconds, for slow motion at half the rate, it is needed to send out the same packets every 2Δ seconds. The resulting streaming rate is R/2.

Using adaptive streaming, any arbitrary slow motion playout speed can be supported. In general for a playout speed of 0<P=α<1, the data is streamed at rate αR.

Similarly, the reverse encoded stream can be adaptively streamed, to support any arbitrary slow rewind playout speed −1<P=α<0, at a bit-rate less than R.

Stream switching and adaptive streaming can advantageously be combined to stream at any arbitrary playout speed (forward or reverse) up to a maximum playout speed corresponding to that of the largest available stream, while ensuring that the streaming bit-rate is smaller than or equal to R. Hence, if the largest available forward playout speed is $P_f$, we can generate all fractions of the rate between 0 and $P_f$ while ensuring that the streaming bit rate is less than or equal to R. Similarly, if the largest available reverse playout speed is $P_r$, all fractions of playout rate between $P_r$ and 0 can be generated.

Bit-rate adaptation (at constant playout speed) using multiple trick-play streams can further be employed. For example, if an available network rate drops below R, packets belonging to a stream can be transmitted with faster playout speed in a delayed manner to achieve a bit-rate smaller than the available bit-rate. As described earlier, if packets are transmitted from a stream with playout speed $P_i$, encoded at bit-rate R at a delay factor D, the achieved bit-rate is R/D and the playout speed is $P_i$/D. Thus, from each available stream (at the different playout speeds) a stream can be generated at the regular playout speed (i.e., 1), but with a bit-rate R/$P_i$.

Then, a stream that satisfies the bit-rate constraints can be selected while maintaining playout (although reduced motion quality may be experienced) at the regular speed. This can also be extended to account for the rewind case.

Multiple streams at different playout speeds can be supported, ensuring that the quality of each decoded frame (compared across different streams) is constant, although this will lead to an increase in the bit-rate for streams at higher playout speeds. It has been shown experimentally that a factor of x leads to an increase in bit-rate by a factor x %.

Figure 2:
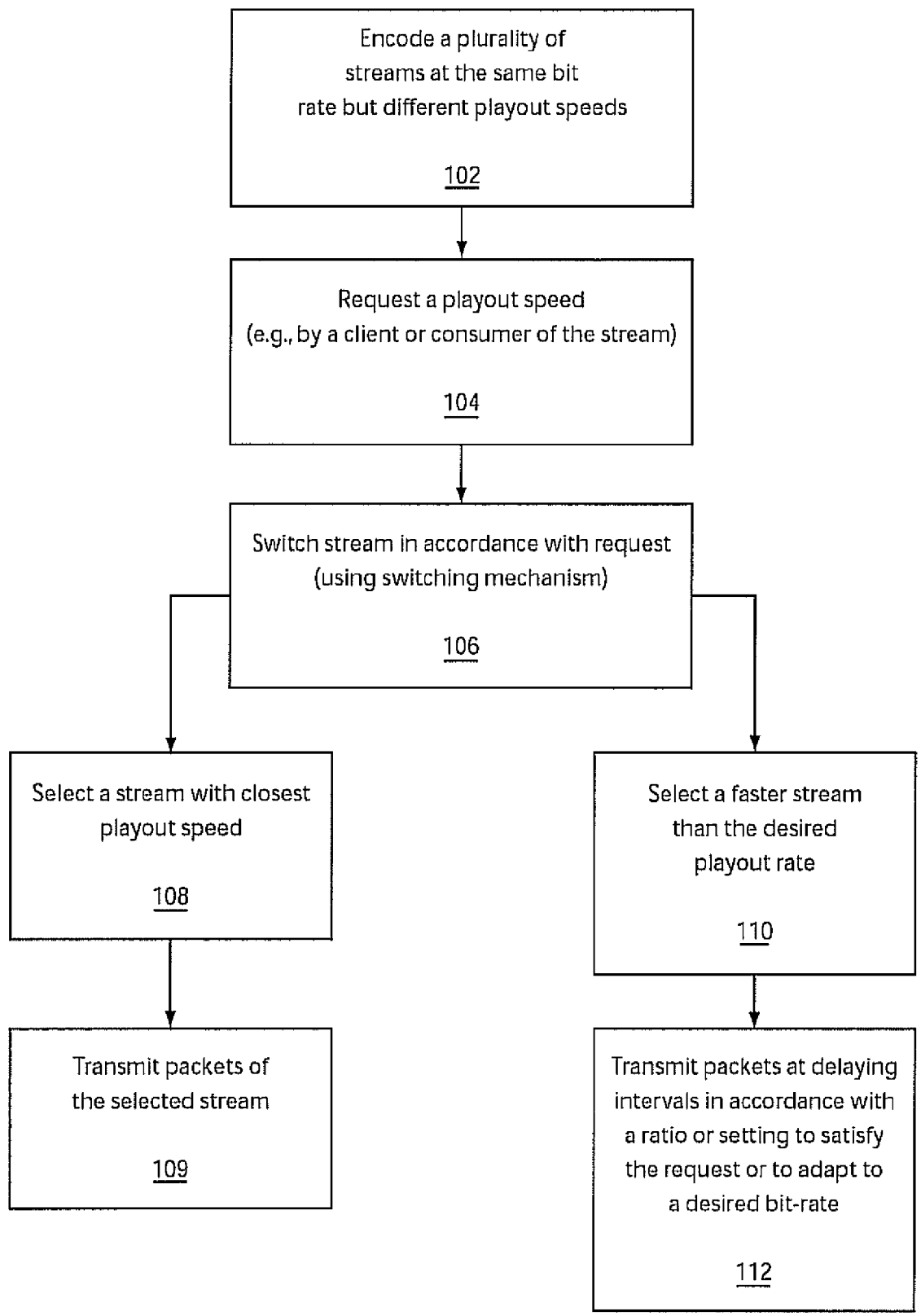
FIG. 2 is a block/flow diagram showing a system/method for bit-rate constrained stream playout at preset speeds including a regular playout speed and other than the regular playout speed.

Referring to FIG. 2, a method for providing trick modes using stream switching and adaptive streaming is illustratively shown. In block 102, multiple streams are encoded at a same bit-rate (R) but at a plurality of playout speeds. These streams have a preset playout speed.

The encoding of multiple streams may include encoding streams with forward or reverse speeds faster or slower than the regular playout speed.

In block 104, a request for a playout speed is made. This request may come from a client or other consumer of the stream. In block 106, a stream is selected from among the plurality of streams, using a switching mechanism. The stream selected may be a stream having a playout speed closest to the requested playout speed and in the desired direction (e.g., forward or reverse) in block 108. In block 109, packets of the selected stream are transmitted to the requester.

Alternately, in block 110, delay elements (e.g., buffer) may be employed to slow a faster stream down to the desired playout speed. The delay may be employed to adapt the stream to a desired output bandwidth or bit rate.

The faster streams may have a playout speed at or faster than a desired playout speed. In block 112, packets are transmitted from the faster stream at delayed intervals corresponding to a ratio of the desired playout speed to the playout speed of a selected stream. This may be applied to rewind, fast forward and regular play desired playout speeds.

For example, a stream may be encoded in reverse to include a rewind stream. The rewind stream may have a playout speed at or greater than a regular playout speed. Packets may be transmitted from the rewind stream at delayed intervals corresponding to a ratio for a slow play fraction of the desired playout speed.

Bit-rate adaptation may be performed in a similar manner using the multiple streams by selecting a stream with a playout speed greater than a desired playout speed. Packets are transmitted from the stream at delayed intervals determined by a bit-rate to be adapted to.

Having described preferred embodiments for bit-rate constrained trick play through stream switching and adaptive streaming (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for bit-rate constrained stream playout at preset speeds including a regular playout speed and other than the regular playout speed, comprising:
    multiple streams encoded at a same bit-rate (R) but at a plurality of playout speeds; and
    a selection mechanism responsive to requests for playout speeds, the selection mechanism selecting from among the plurality of streams to service a request;
    wherein the system adapts to decreases in available bandwidth by applying bit-rate adaptation that includes switching to a higher-speed stream and transmitting packets from said higher-speed stream at delayed intervals to play back at said requested playout speed.

2. The system as recited in claim 1, wherein the multiple streams include forward speeds faster than the regular playout speed.

3. The system as recited in claim 1, wherein the multiple streams include a fast stream with playout speed at or faster than a desired playout speed and further comprising a delay element which transmits packets from the fast stream at the delayed intervals corresponding to a ratio of the desired playout speed to the playout speed of a selected stream.

4. The system as recited in claim 3, wherein the delay element includes a buffer.

5. The system as recited in claim 1, wherein the multiple streams include rewind streams.

6. The system as recited in claim 1, wherein the multiple streams includes a rewind stream with reverse play with a playout speed at or greater than a regular playout speed, and further comprising a delay element which transmits packets from the rewind stream at the delayed intervals corresponding to a ratio for slow play fraction of a desired playout speed.

7. The system as recited in claim 6, wherein the delay element includes a buffer.

8. The system as recited in claim 1, wherein the request includes a client request.

9. The system as recited in claim 1, wherein the multiple streams include preset forward speeds slower than the regular playout speed.

10. The system as recited in claim 1, wherein the multiple streams include preset forward speeds faster than the regular playout speed.

11. The system as recited in claim 1, wherein the multiple streams include preset rewind speeds slower than the regular playout speed.

12. The system as recited in claim 1, wherein the multiple streams include preset rewind speeds faster than the regular playout speed.

13. A method for bit-rate constrained stream playout at preset speeds including a regular playout speed and other than the regular playout speed, comprising:
    encoding multiple streams at a same bit-rate (R) but at a plurality of playout speeds;
    selecting, responsive to a request for a playout speed, from among the plurality of streams to service the request; and
    adapting to decreases in available bandwidth by applying bit-rate adaptation that includes switching to a higher-speed stream and transmitting packets from said higher-speed stream at delayed intervals to play back at said requested playout speed.

14. The method as recited in claim 13, wherein the encoding multiple streams includes encoding streams with forward speeds faster than the regular playout speed.

15. The method as recited in claim 14, wherein the multiple streams include a fast stream with a playout speed at or faster than a desired playout speed and further comprising transmitting packets from the fast stream at the delayed intervals corresponding to a ratio of the desired playout speed to the playout speed of a selected stream.

16. The method as recited in claim 13, wherein encoding multiple streams includes encoding in reverse multiple streams to include rewind streams.

17. The method as recited in claim 16, wherein the multiple streams includes a rewind stream with a playout speed at or greater than a regular playout speed, and further comprising transmitting packets from the rewind stream at the delayed intervals corresponding to a ratio for slow play fraction of a desired playout speed.

18. A non-transitory computer program product comprising a computer readable storage medium having a computer readable program, wherein the computer readable program when executed on a computer causes the computer to perform bit-rate stream playout at preset speeds including a regular playout speed and other than the regular playout speed, comprising:
    encoding multiple streams at a same bit-rate (R) but at a plurality of playout speeds;
    selecting, responsive to a request for a playout speed, from among the plurality of streams to service the request; and
    adapting to decreases in available bandwidth by applying bit-rate adaptation that includes switching to a higher-speed stream and transmitting packets from said high-speed stream at delayed intervals to play back at said requested playout speed.

* * * * *